United States Patent [19]

Beardsley et al.

[11] Patent Number: 5,648,801
[45] Date of Patent: Jul. 15, 1997

[54] GRAYSCALE PRINTING SYSTEM

[75] Inventors: Gary Scott Beardsley, Morgan Hill; Gary Scott Keller; Francis Chee-Shuen Lee, both of San Jose, all of Calif.

[73] Assignee: International Business Machines Corporation, Armonk, N.Y.

[21] Appl. No.: 357,475

[22] Filed: Dec. 16, 1994

[51] Int. Cl.$^6$ .................... B41J 2/205; B41J 2/21
[52] U.S. Cl. .................... 347/15; 347/43; 358/298
[58] Field of Search .................... 347/9, 15, 43; 358/298

[56] References Cited

U.S. PATENT DOCUMENTS

| | | | |
|---|---|---|---|
| 3,922,484 | 11/1975 | Keller | 178/6 |
| 4,365,275 | 12/1982 | Berman et al. | 358/283 |
| 4,389,712 | 6/1983 | Frattarola et al. | 365/127 |
| 4,412,225 | 10/1983 | Yoshida et al. | 346/1.1 |
| 4,412,226 | 10/1983 | Yoshida | 346/1.1 |
| 4,491,875 | 1/1985 | Kawamura | 358/298 |
| 4,547,812 | 10/1985 | Waller et al. | 358/283 |
| 4,673,951 | 6/1987 | Mutoh et al. | 346/75 |
| 4,686,538 | 8/1987 | Kouzato | 346/1.1 |
| 4,701,811 | 10/1987 | Moriguchi et al. | 358/298 |
| 4,714,964 | 12/1987 | Sasaki | 358/298 |
| 4,727,430 | 2/1988 | Miwa | 358/283 |
| 4,746,935 | 5/1988 | Allen | 346/140 |
| 4,771,295 | 9/1988 | Baker et al. | 346/1.1 |
| 4,805,033 | 2/1989 | Nishikawa | 358/298 |
| 4,860,026 | 8/1989 | Matsumoto et al. | 346/1.1 |
| 4,884,080 | 11/1989 | Hirahara et al. | 346/46 |
| 4,985,779 | 1/1991 | Gall | 358/298 |
| 5,014,129 | 5/1991 | Imanishi | 358/166 |
| 5,073,966 | 12/1991 | Sato | 382/56 |
| 5,075,698 | 12/1991 | Aoki et al. | 347/15 |
| 5,075,780 | 12/1991 | Shibahara | 358/298 |
| 5,111,302 | 5/1992 | Chan et al. | 358/298 |
| 5,187,594 | 2/1993 | Deutsch et al. | 358/455 |
| 5,204,753 | 4/1993 | Tai | 358/298 |
| 5,258,849 | 11/1993 | Tai et al. | 358/298 |
| 5,260,807 | 11/1993 | Tai | 358/456 |

OTHER PUBLICATIONS

M. Takahashi, T. Ushioda, R. Uematsu, N. Tagawa, H. Fukuchi, Full-Color Ink-Jet Printer Using Multilevel Ink, SID 85 Digest., 1985 pp. 329–331.

W. Lama, S. Feth, and R. Loce, Hybrid (Gray Pixel) Halftone Printing, SPSE-The Society for Imaging Science and Technology. SPSE 41st Conf. May 1988, pp. 130–135.

*Primary Examiner*—Benjamin R. Fuller
*Assistant Examiner*—Craig A. Hallacher
*Attorney, Agent, or Firm*—James C. Pintner

[57] ABSTRACT

A system is provided for obtaining enhanced quality grayscale printing using standard printer architecture. An image to be printed is scanned to produce several bit maps for image pixels having different optical intensities. The different bit maps are handled by a standard print engine separately, in the same manner as multicolor bit maps would be handled. The image is then printed using a print head assembly having separate print heads for grayscale printing using different optical intensities. Thus, a printed image having enhanced resolution and quality, because of the optical intensity discrimination, is produced using a printer architecture which is the same as a standard multicolor printer architecture except for the front end, which scans for optical intensity, and the print head assembly, which has different print heads designed to produce different optical intensities. The print heads use either different ink dot sizes, inks having different pigment concentrations, or other suitable techniques for varying the optical intensity.

7 Claims, 17 Drawing Sheets

Binary Printing 3X3 Grey Matrix Dot Pattern Examples

Binary Spot (150 μM) -

OD=0.23

OD=0.54

OD=0.72

OD=0.93

OD=1.05

OD=1.11

OD=1.15

OD=1.18

OD=1.2

3 Ink-Dilutions 3X3 Grey Matrices Dot Pattern Examples

Dilution 1(OD=0.2)- Dilution 2(OD=0.8)- Dilution 3(OD=1.2)-

OD=0.57    OD=0.60    OD=0.64    OD=0.69

OD=0.72    OD=0.70    OD=0.72    OD=0.77

OD=0.81    OD=0.86    OD=0.78    OD=0.81

OD=0.84    OD=0.88    OD=0.93    OD=0.99

OD=0.265    OD=0.38    OD=0.42    OD=0.50

3 Drop-Sizes 3X3 Grey Matrix Dot Pattern Examples

Small (55 μM) - ●  Medium (110 μM) - ●  Large (150 μM) - ●

OD=0.64   OD=0.6   OD=0.66   OD=0.74

OD=0.77   OD=0.68   OD=0.76   OD=0.78

OD=0.82   OD=0.88   OD=0.75   OD=0.81

OD=0.85   OD=0.88   OD=0.92   OD=0.97

OD=0.33   OD=0.43   OD=0.52   OD=0.53

GRAYSCALE PRINTING SYSTEM

FIELD OF THE INVENTION

This invention generally relates to a grayscale printing system, and more particularly, to an ink jet printing system that can perform either binary printing or grayscale printing using essentially the same data path.

BACKGROUND OF THE INVENTION

Binary (or bi-level) printing technologies such as wire matrix, thermal transfer, electrophotography and ink jet, place a mark or dot of constant optical intensity on the printing medium (e.g., paper) on demand. No dot is placed on the printing medium when printing is not required. Image and text are printed by proper placement of dots in pre-constructed patterns. Because of their binary nature, It is not a straightforward process to generate grayscales in these binary printing technologies.

Conventionally, a grayscale is generated by creating individual tone cells. A tone cell is defined as a matrix of juxtaposed dots. By placing various numbers of dots in certain dot positions of the matrix, while leaving the remaining dot positions blank, a grayscale composed of a number of gray tones can be generated. The practical resolution of the grayscale or tone images is reduced by the size (that is, the total number of dot positions) of the tone cells. For example, a 300 dots per inch (dpi) printing resolution with 3×3 tone cells results in a practical tone resolution of only 100 cells per inch. This produces resolution which is coarse enough to appear rather grainy to the human eye.

According to a particular example of prior art, W. Lama et al., "Hybrid (Gray Pixel) Halftone Printing," J. Imaging Tech., Vol. 15, No. 3, pp. 130–135, June 1989, incorporated herein by reference, the number of gray steps that can be achieved with the above binary tone cells is p+1, where p is the total number of dot positions in each tone cell. For example, a 3×3 tone cell would have 9 dot positions and 10 gray levels. See, e.g., FIG. 1A. In addition, the correlation between the measured optical densities and the assigned gray levels deviate substantially from linearity, signifying an unevenly distributed grayscale. See FIG. 1B. Furthermore, to print high-quality gray images, a large number of tone steps, e.g., greater than 64, is required. This makes it virtually impossible to achieve a large number of tone steps by using the above simple tone cell method in conjunction with a moderately low dot-resolution binary printer.

To increase the tone capability without forcing print engine design to a much higher resolution requiring elaborate and complicated hardware, there exist methods that would generate a large number of gray tones by introducing another dimension to the tone cells. One possible additional dimension is an intensity level for the individual dot. The default number of levels per dot is 2. That is, a dot matrix position can be either "white" (no dot) or "black" (with dot). An additional dimension may be added by increasing the number of intensity levels. Typically, this is achieved by the addition of several optical intensity (OI) levels at each dot position.

The above-cited reference by Lama et al. also gives formulas for calculating tone steps. For example, given a 3×3 tone cell, a 55 tone-step grayscale can be generated by the use of 3 levels of OI (including "white"), a 220 tone-step grayscale by 4 levels of OI, and a 715 tone-step grayscale by 5 OI levels.

To utilize this enhanced grayscale approach in binary printing, specific software and interface electronics have conventionally been required to translate the input image files to printing files containing the grayscale tone-cell transformation. Since different binary printing technologies can generate the required OI levels in a variety of ways, there were no convenient or standard architectures that were universally adopted or followed in the trade.

According to M. Takahashi et al., "Full-Color Ink Jet Printer Using Multilevel Ink," Soc. Inform. Display International Symposium Digest, Vol. 16, Orlando, Fla., Apr. 30–May 2, 1985, incorporated herein by reference, a print engine having either multiple printheads or a single printhead having multiple groups of active printing elements can be tailored to grayscale printing applications. For example, each of the printheads in the print engine or each group of active printing elements in the single printhead can be designed to produce dots of a specific optical intensity, either by producing specific spot sizes on the printing medium, usually paper, or by laying down marking substance of specific concentrations (e.g., by varying the amount of dyes in the ink) but keeping the dot size constant. For such architectures, the number of total OI levels is 1 plus the number of printheads or groups of active printing elements. The one extra OI level is attributable to the no-dot situation, i.e., the "white" background.

As a particular example of the prior art usage of multiple optical intensities, consider Sasaki, "Intermediate gradient image forming method," U.S. Pat. No. 4,714,964, issued Dec. 22, 1987, which discloses an image forming technique using two or more dot sizes and different coloring concentrations to form tone matrices. To suppress pseudo outlines which might take place when tone-cell optical density changes abruptly from one cell to the next, the optical density of the smallest dot comprising a high-concentration ink is set to be smaller than the optical density of the largest dot comprising a low-concentration ink.

As another example of the prior art, consider Hirahara et al., "Color image printing apparatus," U.S. Pat. No. 4,884,080, issued Nov. 28, 1989, which describes a color thermal dye transfer printer that prints a dot of a predetermined size corresponding to the density of each pixel of each color in a dot matrix corresponding to one pixel. The printer can produce a stable hue even if the positions of the printed dots of the respective colors are misregistered by a mechanical error and can prevent degradation in the image quality of the printed image due to moiré fringes.

As still another example of the prior art, consider Allen, "Multitone ink jet printer and method of operation," U.S. Pat. No. 4,746,935, issued May 24, 1988, which discloses a method and apparatus useful for eight level halftone thermal ink jet printer by printing with ink droplets having volumes weighted in a binary sequence (that is, the droplets have volumes weighted by factors of 1, 2, and 4).

Three binary-weighted printing elements (drop generators) are sequentially fired at a chosen pixel, as the printing elements come into alignment with the pixel through the relative movement between the printhead and the paper. Firing one to three binary-weighted drop generators produces 1 to 7 volume units of ink within the pixel, thus producing an 8-level grayscale.

Alternatively, the optical density of ink ejected into a given pixel area during a halftoning printing operation may be reduced by ejecting a drop of untoned ink vehicle into the pixel before one or more ink droplets are ejected into the same area. This process eliminates the objectionable optical characteristics such as graininess, which are caused by individual high-contrast dots which are far enough apart, for a desired light gray tone, to be perceived as standing alone.

In the multi-element printhead of Allen, each of the three binary-weighted drop generators comprises a thin-film resistor and an orifice. The resistors and orifices vary in size so as to create the binary weighting effect. However, the Allen patent does not discuss designs for the heaters and the orifices such that multiple drops can address the same pixel as the printhead and the paper move, relative to each other.

As a further example of the prior art, consider Baker et al., "Thermal ink jet pen body construction having improved ink storage and feed capability," U.S. Pat. No. 4,771,295, issued Sep. 13, 1988, which describes multiple ink storage compartments communicating with a multi-orifice thermal ink jet printhead. These compartments preferably comprise reticulated polyurethane foams of controlled porosity and capillarity and are especially suitable for storing different inks, e.g., cyan, magenta and yellow color inks. The Baker patent is herein incorporated by reference.

Thus, several prior art systems described above have, in common, the drawback that they have special purpose architectures for the particular problems they seek to solve, and for the particular tasks they are customized for. It would be preferable to provide a more general purpose architecture, usable for a wider range of printing applications.

SUMMARY OF THE INVENTION

Accordingly, it is an object of the present invention to a simple and convenient way to increase the number of gray tones available at relatively low dot densities to enhance printing image qualities.

It is another object of the present invention to provide a dual function grayscale printing system that can perform either binary printing or grayscale printing or both using essentially the same standardized printing system.

It is a further object of the present invention to achieve grayscale printing by combining the system concepts of a color print engine tailored to multiple optical intensity tone generation and the concept of color data path carrying multiple (e.g., 4 for YMC data path and 5 for YMCK data path) optical intensity information, and thereby to reduce hardware requirements for printing.

In accordance with one aspect of the present invention, a gray image file is fed to a front-end data transformer which converts the input image to the OI tone bit maps containing tone cell and OI-level information. Specific OI-level information are split up into separate bit maps containing tone data of only one OI level. Each bit map plane, for a respective OI level, is associated with a respective color (e.g., low OI with yellow, medium OI with magenta, etc.) and is delivered to the existing color print driver for the respective color.

The print driver treats the tone color-coded bit map planes as separate bodies of data, as though those bodies of data were in fact bodies of data for the respective colors. The print driver processes the pseudo "color" data in its normal way and sends data to the printer controller. The printer controller in turn places the data to the gray tone printhead conforming to the format of the color head. High-quality gray tone images can then be printed using the unaltered printer box and its matching print driver.

In accordance with another aspect of the present invention, a grayscale thermal ink jet printhead can be designed to generate either multi-dilution or multi-size ink spots for grayscale printing.

It is an advantage of the present invention to produce high-quality gray tone printing in both monochrome and color applications at low to moderate costs.

It is another advantage of the present invention that multiple OI-level printheads can be designed to achieve grayscale printing without the need for any major change to the hardware or software of the computer system and the printing system.

It is a further advantage of the present invention that, with minimal modifications, e.g., by adding a front-end data transformer and suitable print heads to the print driver, standard printers can be utilized to print high-quality monochrome or multi-color grayscale images.

Recently, standards for print driver software and interface electronics for color printing have emerged. The standardization of YMC (yellow, magenta and cyan) or YMCK (yellow, magenta, cyan, black) data streams delivered by a host, e.g., a personal computer, to the printer controller is also taking shape.

In this context, although the above-mentioned prior-art references teach various methods and systems for grayscale printing, none of them have made use of these emerging standards of interfaces, drivers and data streams, nor have they disclosed detailed and enabling methodology for making grayscale printheads or print engines.

In contrast, the present invention teaches unique and convenient ways to increase the number of gray tones given the relatively low dot density of a standardized printing system. Such new grayscale printing technology and systems will greatly enhance the image quality of printing output without escalating hardware and software costs.

While the invention is primarily disclosed as an apparatus or printing system, it will also be understood by a person of ordinary skill in the art that an apparatus in accordance with the invention may be implemented to include a conventional data processor, including a CPU, memory, I/O, program storage, a connecting bus, and other appropriate components. Such a system could be programmed or otherwise designed to facilitate the practice of a method in accordance with the invention. Such a processor would include appropriate program means for executing the method of the invention.

Also, an article of manufacture, such as a pre-recorded memory chip, floppy disk, or other similar computer program product, for use with a printing system having data processing capability, could include a storage medium, such as a memory chip, and program means recorded thereon, in the form of program instructions which may be in object code form, for directing the data processor to facilitate the practice of the method of the invention. It will be understood that such apparatus and articles of manufacture also fall within the spirit and scope of the invention.

These and other objects, advantages, and features of the present invention will no doubt become apparent to those skilled in the art, and the invention itself will be best understood by reference to the following detailed description read in conjunction with the various accompanying drawings.

DESCRIPTION OF THE PREFERRED EMBODIMENT

Figure 1A:
FIG. 1A depicts a typical set of 3×3 tone cells for binary grayscale printing.
Figure 1A:
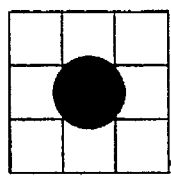
Figure 1A:
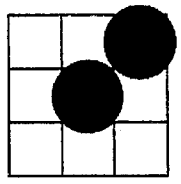
Figure 1A:
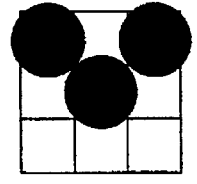
Figure 1A:
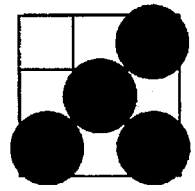
Figure 1A:
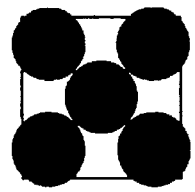
Figure 1A:
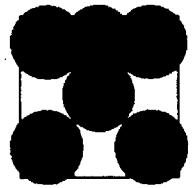
Figure 1A:
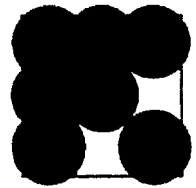
Figure 1A:
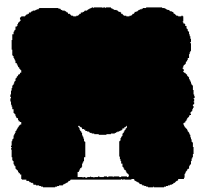
Figure 1A:
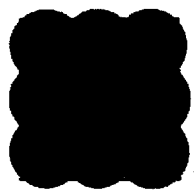
Figure 1B:
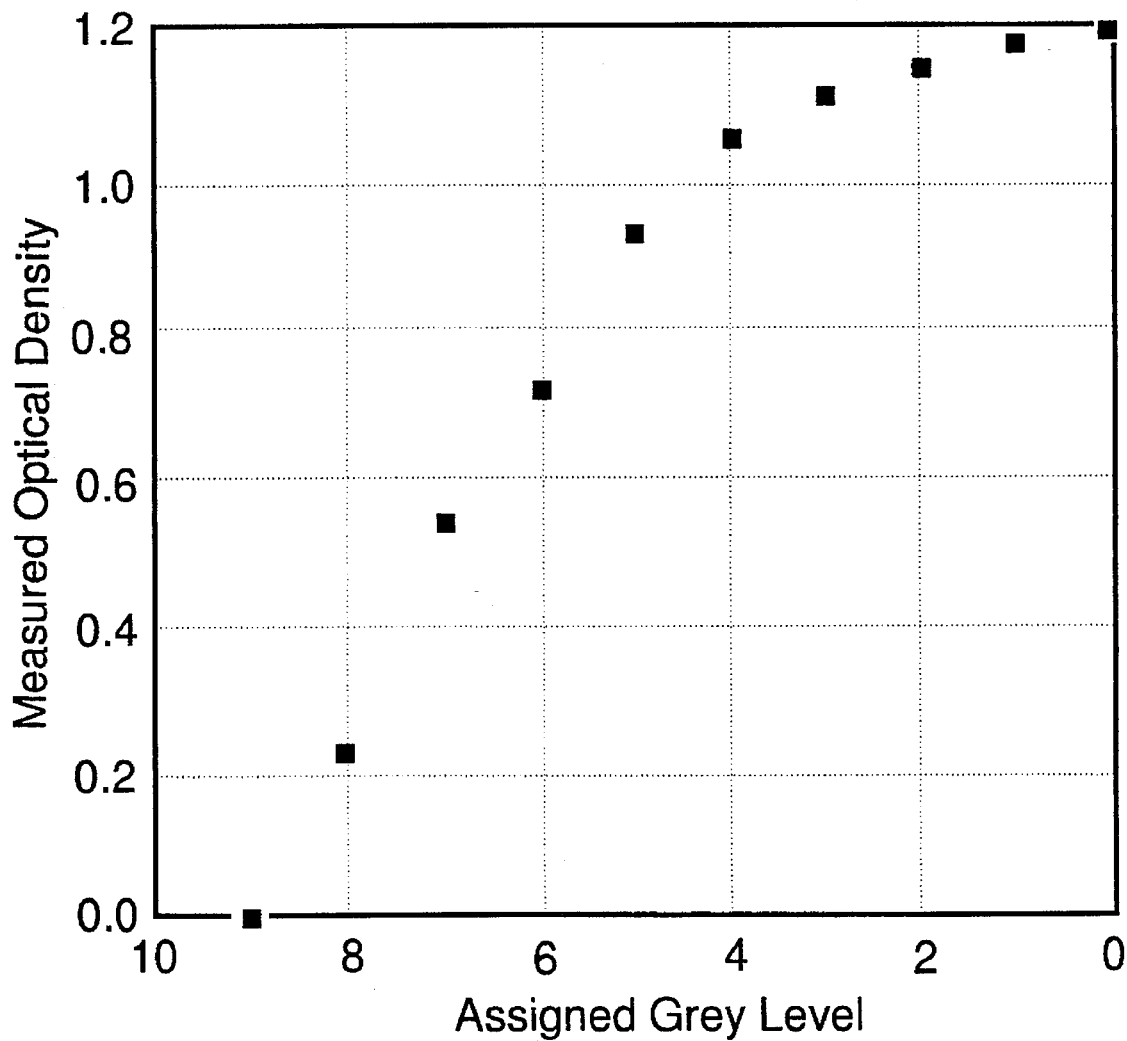
FIG. 1B is a plot of measured optical densities versus assigned gray levels generated by the tone cells of FIG. 1A.

While the present invention may be embodied in many forms, several particular embodiments are shown in the drawings. It is understood that the present disclosure is not intended to limit the invention to the embodiments illustrated.

According to one aspect of the invention, a relatively low dot-density print engine capable of printing in a plurality of optical intensifies is fabricated, following the configuration of a commercially available, standardized multicolor print engine. Without losing generalities, a 300 dpi grayscale thermal ink jet printhead may be fabricated following the configuration of an ink jet YMC-color print head.

The three OIs are conveniently generated either by producing three distinct dot sizes on the printing medium, e.g., paper, or by producing dots of the same size, but containing three different dye or colorant concentrations. In accordance with the invention, printheads designed to produce the above OIs are designed for compatibility with existing color print engines. Thus, information relating to the different OIs is handles by the print engine as though it were color information. As one example, the printhead can be fabricated such that it will produce high-OI dots with the "cyan" group, medium-OI dots with the "magenta" group, and low-OI dots with the "yellow" group. However, any other correlation between colors and OI magnitudes may also be used.

During printing, the above grayscale print engine makes use of the color data path of the above standardized multicolor print engine. For example, the cyan print data excites the high-OI print elements, the magenta print data excite the medium-OI elements, and the yellow data excites the low-OI elements. The matching between the OI levels and the color groups is arbitrary; therefore, other matching arrangements are possible as long as the gray conversion software follows the matching respectively. Each printing element of the print engine, whether it corresponds to the low, medium or high OI, can address every printing position of the printing medium as required by the printing signals.

PRINTING SYSTEM HAVING COLOR PRINT DRIVER

Figure 2A:
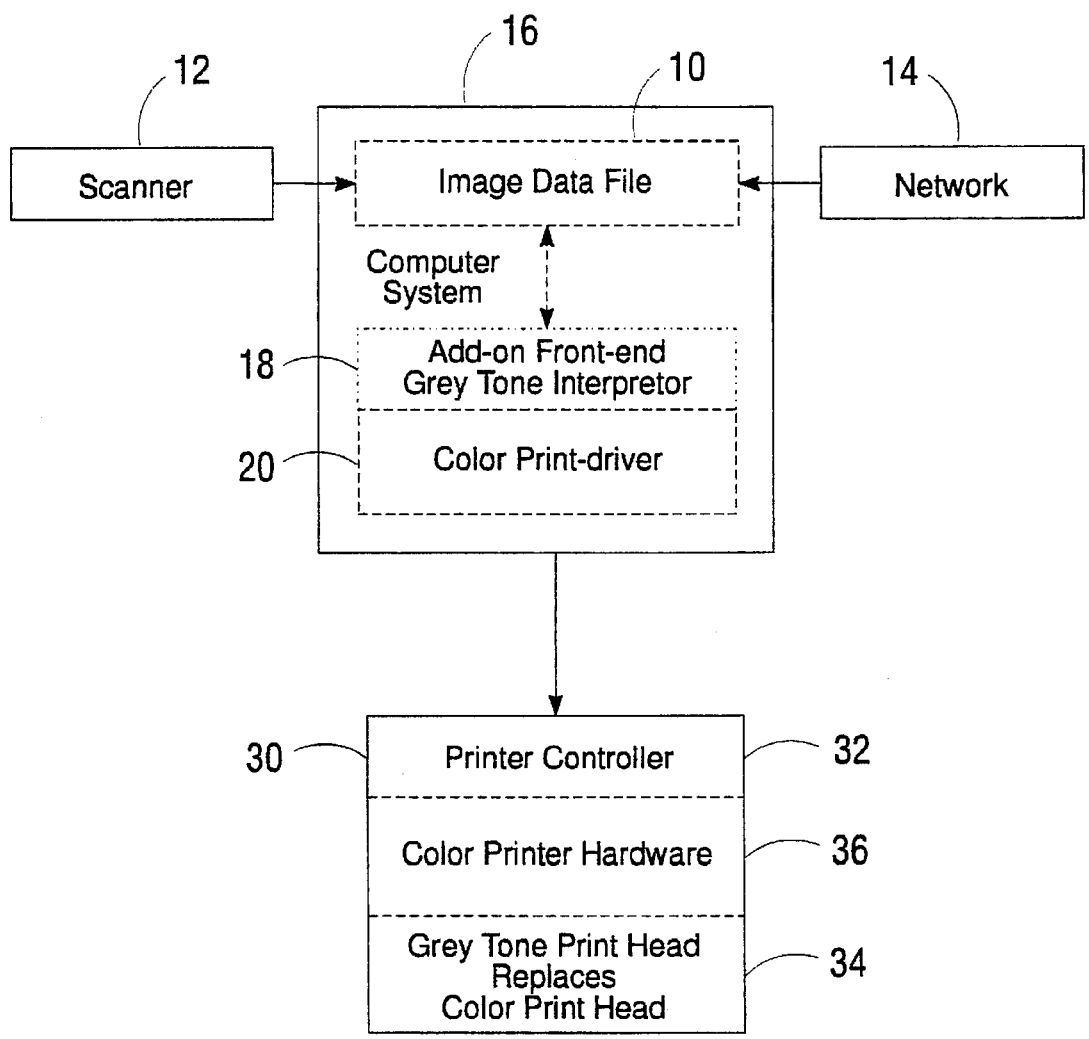
FIG. 2A is a schematic representation of a computer printing system for printing monochrome grayscale images from a standardized binary color printer.

A particular embodiment of the above system concept is shown, in FIG. 2A, as a color print driver including a grayscale data interpreter. Gray image data files 10, provided by an external source, e.g, a scanner 12 or a network 14, are fed to a computer system 16 through a front-end grayscale data interpreter 18. The data interpreter 18 may conveniently be implemented in the form of a microcode attached to the front end of a color print driver 20 located in the computer system 16. The data interpreter 18 may also be integrated into the print driver 20 by the provider of the print driver 20.

Figure 2B:
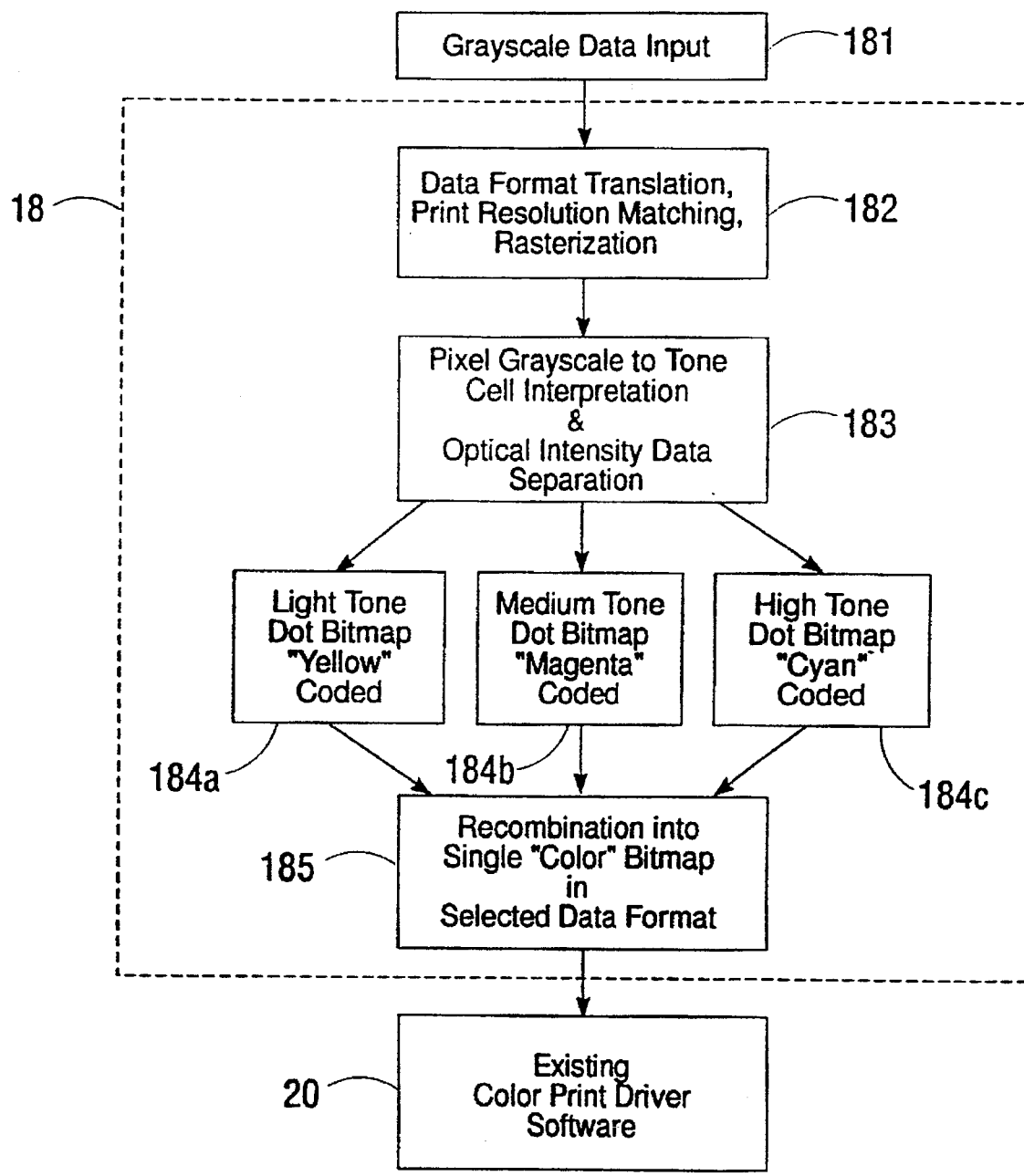
FIG. 2B is a flow chart showing operations performed by the front-end grayscale data interpreter depicted in FIG. 2A.

FIG. 2B is a flowchart showing the operation of the front end interpreter 18 of FIG. 2B. The interpreter 18 first performs conventional data format translation, print resolution matching, and rasterization on the input grayscale image 181. These are collectively shown as step 182.

The processed pixel grayscale image data is then interpreted in terms of tone cells (step 183). As shown, the tone-cell-based OI information is split up into several bit maps, also referred to as bit map planes. In the present example, three bit maps 184a, 184b, and 184c are shown. Each of the three bit maps 184a, 184b, and 184c contains tone data of only one OI level, e.g., light tone dot bitmap, medium tone dot map and high tone dot map.

In accordance with the invention, each bit map plane is coded with a pseudo-color, i.e., "yellow," "magenta" and "cyan." The pseudo-color bit map planes are then recombined into a single pseudo-color bit map (step 185) in a format that is compatible with the data format of the color print driver 20. The pseudo-color bitmap is then passed on to the color print driver 20 (FIG. 2A), which processes the pseudo-color information as if it was color data, and sends the processed data to a printer controller 32 of a printer system 30.

The printer controller 32 sends the processed pseudo-color data to a grayscale printhead 34. In accordance with the invention, the grayscale print head 34 has been fabricated in conformance with the format of a color printhead which might conventionally be used along with the system of FIG. 2A. Accordingly, the data from each of the respective bit map planes is directed to the appropriate print head for the corresponding optical intensity, just as data from conventional color bit map planes would be directed to the appropriate print head for the corresponding color.

Hence, high-quality grayscale images can be printed without any need to alter or modify printer hardware 36 or the matching printer controller 32. The dot resolution of the 220-tone-step grayscale images will be comparable to the original resolution of the color printer mandated by the unaltered print hardware. However, the image quality will be significantly improved by the enhanced tone contents of the print output.

According to another aspect of the invention, which is also germane to the above preferred embodiment, the above grayscale printhead 34 may conveniently be made plug-compatible with a standardized commercial color printer 30 driven by factory-supplied color print drivers 20 installed in the computer system 16. The design principles of a typical grayscale printhead 34 will be discussed below. The standardized color printing system can thus be used as a monochrome grayscale printer with the aforementioned grayscale printhead replacing the original color printhead.

Because standardized printer hardware, such as a thermal ink jet printer, commonly employs disposable printheads, the replacement of the original printhead by a separately fabricated grayscale printhead does not require any alteration to the printer box hardware. Additionally, the only change in software or firmware that is necessary for the color-to-grayscale transformation is the use of a front-end data interpreter 18 in conjunction with the original color print driver 20 of the computer system 16.

According to a further aspect of the invention, the invention can be implemented with any one of a number of grayscale data transformation schemes, e.g., the tone cell method where a fixed matrix of dot positions can produce many gray steps through proper combinations of the multi-OI-level dots. Even though the formulas provided by the afore-cited reference by Lama et al. are based on one OI level per printing position, more than one OI dot can be placed at one printing position within a tone cell. Such "dot-over-dot" combinations will produce more OI levels at each printing position. Other methods which would be known to persons skilled in the art, such as dither matrix, oblige tone cell, error diffusion scheme, and so on, can also be used as the basis for grayscale data transformation, with either single or multiple OI-level dots at one printing position.

Within the spirit of the above "dot-over-dot" scheme, the printing position may be addressed by OI dots coded with secondary colors "red," "green," "blue" or "black," each of which is realized as a combination of the primary ink colors "yellow," "magenta" and "cyan." A person skilled in the art will be able to design the data interpreter to split these secondary color codes into primary color codes, as well.

The aforesaid OI dot pattern is split into three image planes. Without losing generalities, the low-OI level forms a pseudo "yellow" data plane, the medium-OI level forms a pseudo "magenta" data plane, and the high-OI level forms a pseudo "cyan" data plane. The "white" level is represented by no data in each of the three planes (assuming that the printing is to take place on white paper).

The three data planes are color-coded and are subsequently recombined back into a "color" data file pertaining to a standard format which the print driver can interpret. Upon receiving the "color" data from the computer, the printer controller will "color-separate" the data and send the "yellow" coded data to the low-OI printing elements of the printhead, the "magenta" coded data to the medium-OI printing elements, and the "cyan" coded data to the high-OI printing elements. Thus, the grayscale printhead prints the three OI levels in the same way as a color printhead prints the three color groups.

The aforementioned grayscale printing can conveniently be adopted for printing monochrome grayscales in a four-color (e.g., YMCK) printer. The availability of four OI-level dots, plus white as the fifth OI level, will generate high-quality grayscale images of 715 tone steps.

PRINTING SYSTEM HAVING MONOCHROME PRINT DRIVER

To further illustrate the above several aspects of the invention, consider the particular implementation of the grayscale printing method for grayscale printing by using a serial monochrome printer data path. Specifically, monochrome grayscale printing can be achieved by using a standardized monochrome printer driver and a standardized printer controller with a new monochrome grayscale printhead and an additional front-end data interpreter for grayscale interpretation, bit map rearrangement, and print line indexing adjustment.

Figure 3A:
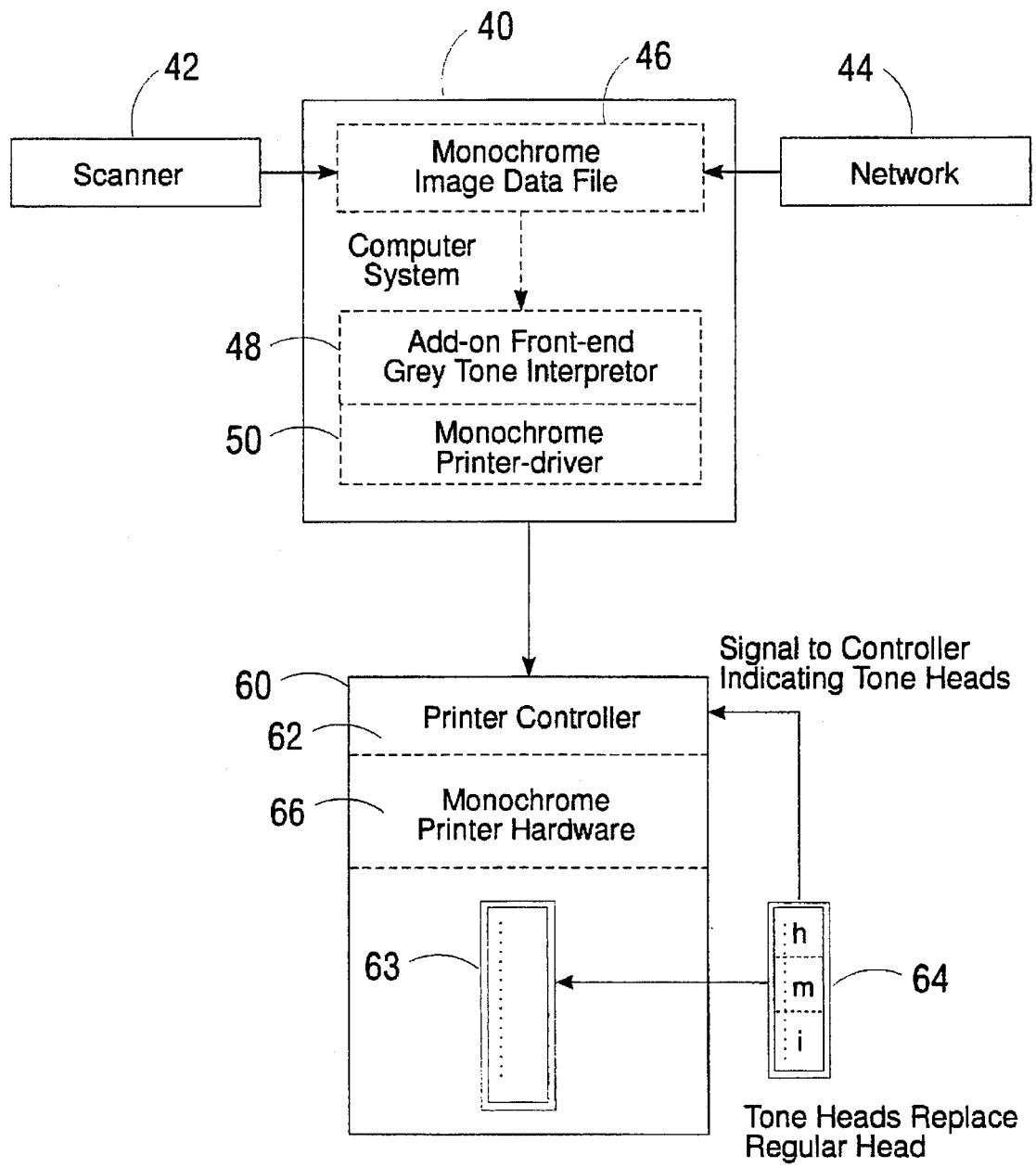
FIG. 3A is a schematic representation of a computer printing system for printing monochrome grayscale images from a standardized binary monochrome printer.

A particular embodiment of the above system concept of grayscale printing is shown in FIG. 3A. Gray image data files 46 provided by an external source, e.g, a scanner 42 or network 44, are fed to a computer system 40 through a front-end grayscale data interpreter 48. The data interpreter 48 may conveniently be implemented in the form of a microcode attached to the front end of a monochrome printer driver 50 located in the computer system 40. The data interpreter 48 may also be integrated into the printer driver 50 by the manufacturer or supplier of the print driver 50.

Figure 3B:
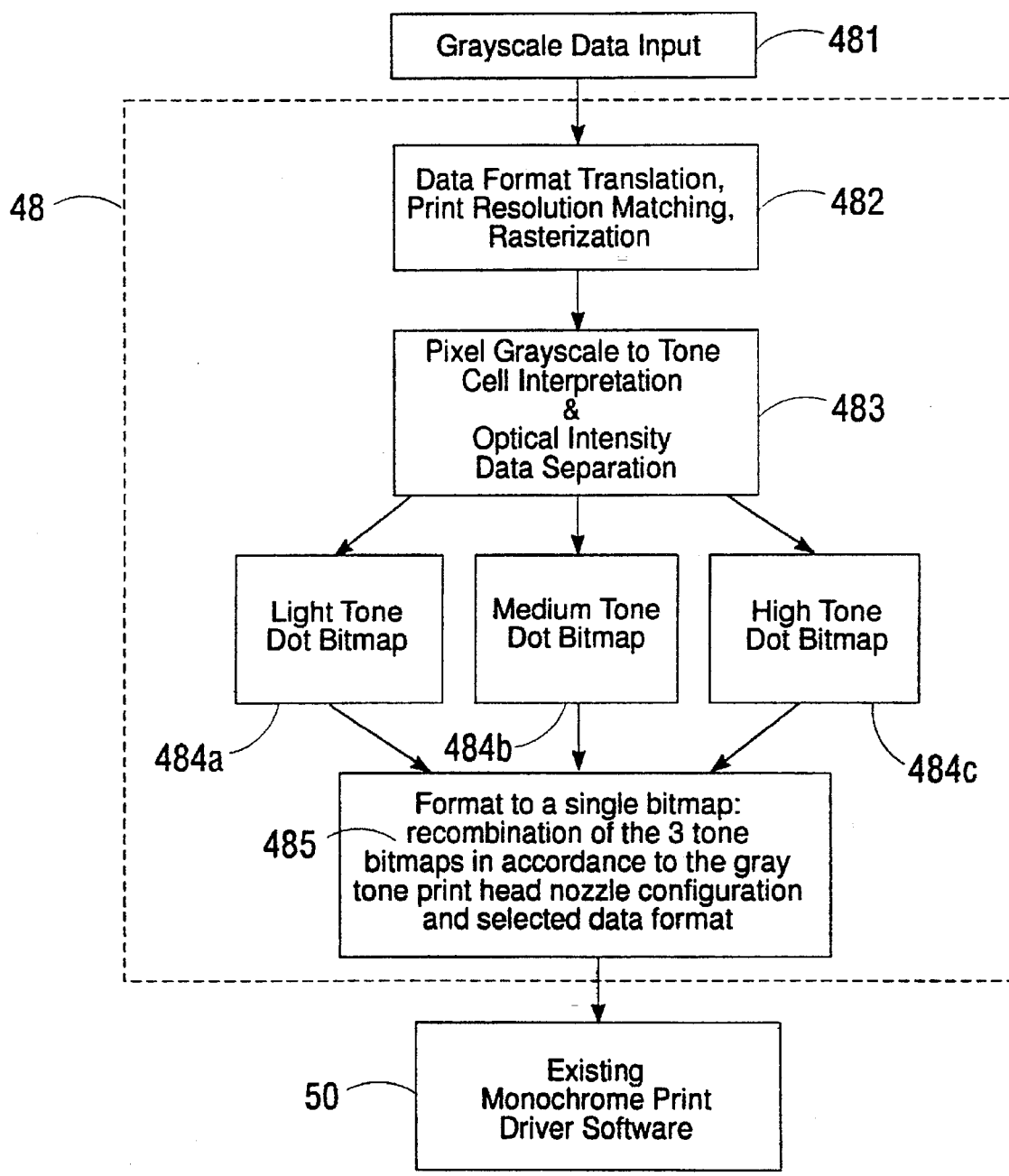
FIG. 3B is a flow chart showing operations performed by the front-end grayscale data interpreter depicted in FIG. 3A.

FIG. 3B is a flowchart showing, in more detail, the operation of the Gray Tone Interpreter 48 of FIG. 3A. The data interpreter 48 first performs data format translation, print resolution matching, and rasterization on the input grayscale image 481 (step 482). Each of these operations is individually known to a person skilled in the art.

The processed pixel grayscale image data is then resolved into tone cells, to produce tone cell based optical intensity information (step 483). The tone-cell-based OI information is split up into several separate bitmaps. In the present example, there are three bitmaps 484a, 484b, and 484c, each containing tone data of only one OI level, e.g., light tone dot bitmap, medium tone dot bitmap and high tone dot bitmap.

The bit planes 484a, 484b, and 484c are buffered, so that data can come in and go out asynchronously, if required. Also, their formats need not be the same.

The tone dot bitmaps 484a, 484b and 484c are then re-formatted into a single bitmap (step 485), through the recombination of the several tone bitmaps, in accordance with the grayscale printhead nozzle configuration. The tone bitmap is in a format compatible with the data format of the monochrome printer driver 50. Again, a person skilled in the art would know how to program the above recombination and formatting operations.

The single bitmap is then passed on to the monochrome printer driver 50. Referring again to FIG. 3A, the driver 50 processes the grayscale tone bitmap, as if the bitmap were ordinary monochrome data, and sends the processed data to a printer controller 62 of a printer system 60. The printer controller 62 in turn sends the grayscale data to a monochrome grayscale printhead 64, which has been installed in place of a regular monochrome printhead 63.

The monochrome grayscale printhead 64 is made in general conformance with the configuration of the regular monochrome printhead 63. In addition, the printing elements of the grayscale printhead 64 is divided into several subgroups, each having the ability to print dots of a specific OI level. For instance, in the present example, where there are three OI levels and three subgroups, one possible arrangement has subpart h for high-OI, high-tone dots, subpart m for medium-OI, medium-tone dots, and subpart 1 for low-OI, light-tone dots.

A standard commercial printer, such as the ink jet printers made by Hewlett-Packard Co., may be used as the printer 60 of FIG. 3A. Such printers are generally equipped with the ability to sense the identity of the printhead installed thereon. This printhead sensing feature is familiar to persons skilled in the art, so details about sensing printheads will be omitted. This sensing feature enables the printer to sense the presence of either a regular head 63 or a grayscale head 64. Thus, the present invention readily converts a standard monochrome printer into a dual-function tone printer, with minimal modifications to the commercial systems.

During the normal operation of a binary monochrome printer 60, the printhead 63 scans across the paper, to print each print line or band. The paper indexes one print line or band after the print scan. The aforesaid data interpreter 48 may be designed to provide instructions to change paper index on demand.

Upon sensing the grayscale head 64, the printer controller 62 changes the paper index accordingly to meet the change in print line height, and to match the subparts of the grayscale printhead. In this particular example, paper index will be one third of the regular length. The add-on front-end data interpreter 48 then performs the data transformation in the afore-depicted manner.

The embodiments of the invention shown in FIGS. 2A and 3A, while substantially similar, are different in that in FIG. 3A (unlike FIG. 2A), the high, medium, and light tone data are put into the correct ordering when they are recombined to a format compatible with the regular monocrome print driver 50. Thus, after going through the regular printer driver 50 and printer controller 62, the high data, medium data and light data respectively activate the corresponding high, medium, and light subparts of the grayscale printhead. Thus, high-quality grayscale images can be printed, without any need to substantially alter or modify the printer hardware 66 and its matching printer controller 62.

In the above preferred embodiment of FIG. 3A, the grayscale printhead 64 may conveniently be made plug-compatible with a standardized commercial monochrome printer 60 driven by factory-supplied color print drivers 50 installed in the computer system 40. The standardized monochrome binary printing system can thus be used as a monochrome grayscale printer with the aforementioned grayscale printhead 64 replacing the original regular printhead 63. Because standardized printer hardware, such as thermal ink jet printers, generally employ disposable printheads, the replacement of the original printhead by a separately fabricated grayscale printhead does not require any alteration to the printer hardware 66. Furthermore, the only change in software or firmware that is necessary for the monochrome-to-grayscale transformation is the use of a front-end data interpreter 48 in conjunction with the original monochrome printer driver 50 of the computer system 40.

FULL COLOR PRINTER

Figure 4:
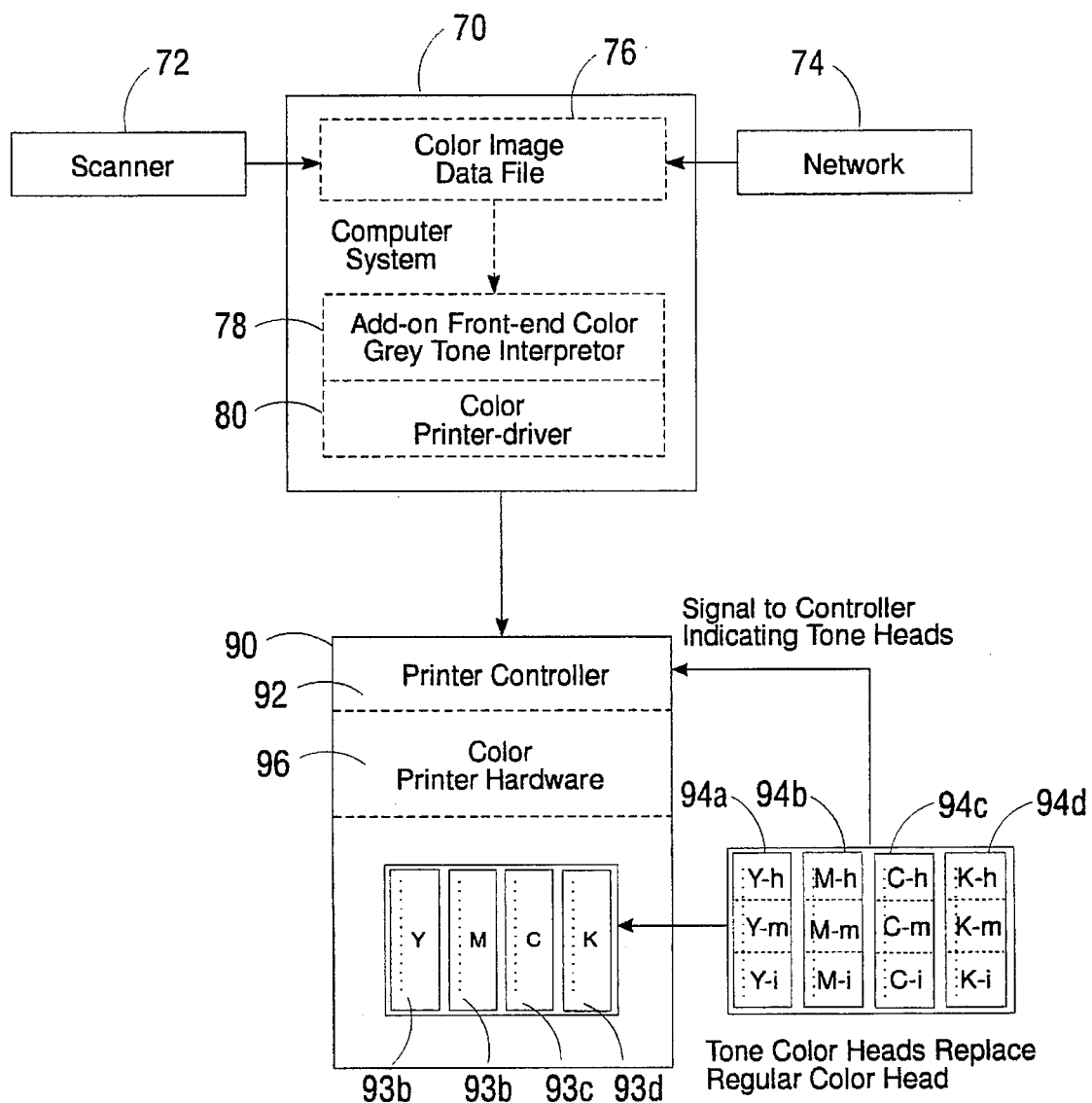
FIG. 4 is a schematic representation of a computer printing system for printing color grayscale images from a standardized binary color printer.

Within the spirit of the above grayscale printing using the monochrome printer data path, the present invention can be extended to a full-color printer using existing color printer driver and printer controller, as depicted in FIG. 4.

Note, in passing, that a computer system may encompass both a monochrome and a color printer driver for the user to select. Thus, several grayscale printheads are used simultaneously in a binary color printer designed to print with four single-color (e.g., Y, M, C and K) printheads 93a, 93b, 93c and 93d. Each printhead is filled with one of the four color inks.

In this arrangement, each printhead will produce three OI levels by generating dots of three different sizes, or dots containing three different dye concentrations.

Conveniently, the regular set of single-color printheads 93a–93d may be replaced by grayscale single-color printheads 94a–94d. These grayscale printheads are designed in general conformance with the single-color printheads, except that each grayscale printhead 94a, 94b, 94c or 94d is divided into several subgroups (three, in the present example).

Each subgroup has the ability to print color dots of one OI level. There are shown a total of twelve subgroups, three subgroups for each of four ink colors. The subgroups are labeled as follows: Y-h for high-OI yellow, Y-m for medium-OI yellow, Y-l for low-OI yellow, M-h for high-OI magenta, M-m for medium-OI magenta, M-l for low-OI magenta, C-h for high-OI cyan, C-m for medium-OI cyan, C-l for low-OI cyan, K-h for high-OI black, K-m for medium-OI black, and K-l for low-OI black.

An overall discussion of the system shown in FIG. 4 will now be given. A front-end data interpreter 78, added to a color printer driver 80 of a computer system 70, will process color image data files 76 provided by either a scanner 72 or network 74. Similar to the above embodiment of monochrome grayscale printing shown in FIG. 3A, each color group is divided into three subgroups having high, medium and low OIs, respectively.

The data interpreter 78 will first transform yellow information into three-OI-level tone data, following by the transformation of magenta, cyan and black data, respectively. Thus, the data interpreter 78 processes the incoming image data file 76 into twelve tone bitmaps, three for each of the four primary colors of YMCK.

The data interpreter 78 will then recombine the tone bitmaps into a color data format compatible with the regular color printer driver 80. In addition, tone data information are embedded in the YMCK color data stream with such a data design that yellow h data will run the Y-h printhead subgroup, yellow M data will run the Y-m printhead subgroup, etc.

From the color printer driver 80, a printer controller 92 located in a printer system 90 receives the four groups of color data, each group including three subgroups of bit maps representing the corresponding tone information.

Thus, full-color grayscale printing can be accomplished by the use of four single-color grayscale printheads in a printing system originally designed for binary color printing. Again, no change need to be made to the color printer hardware 96.

During operation, the paper index will be changed after the printer box 90 senses the replacement of a regular head by a grayscale color printhead. Again, the paper index is adjusted to one-third of the regular length. The aforesaid data interpreter 78 may be designed to provide instructions to change paper index on demand. Upon sensing the grayscale printheads 94a–94d, the printer controller 92 will change the paper index accordingly to meet the change in print line height and match the subparts of each grayscale printhead.

PRINT HEAD

Having stated the system concepts of performing grayscale printing from standardized commercial printing systems, a detailed and enabling description of a method for designing a grayscale thermal inkjet printhead generating several sizes of ink droplets is given below. Note that a person skilled in the art would be able to make a grayscale inkjet print head for generating one-size ink droplets having several different concentrations by following, for example, the teachings of U.S. Pat. No. 4,771,295, cited above.

Figure 5:
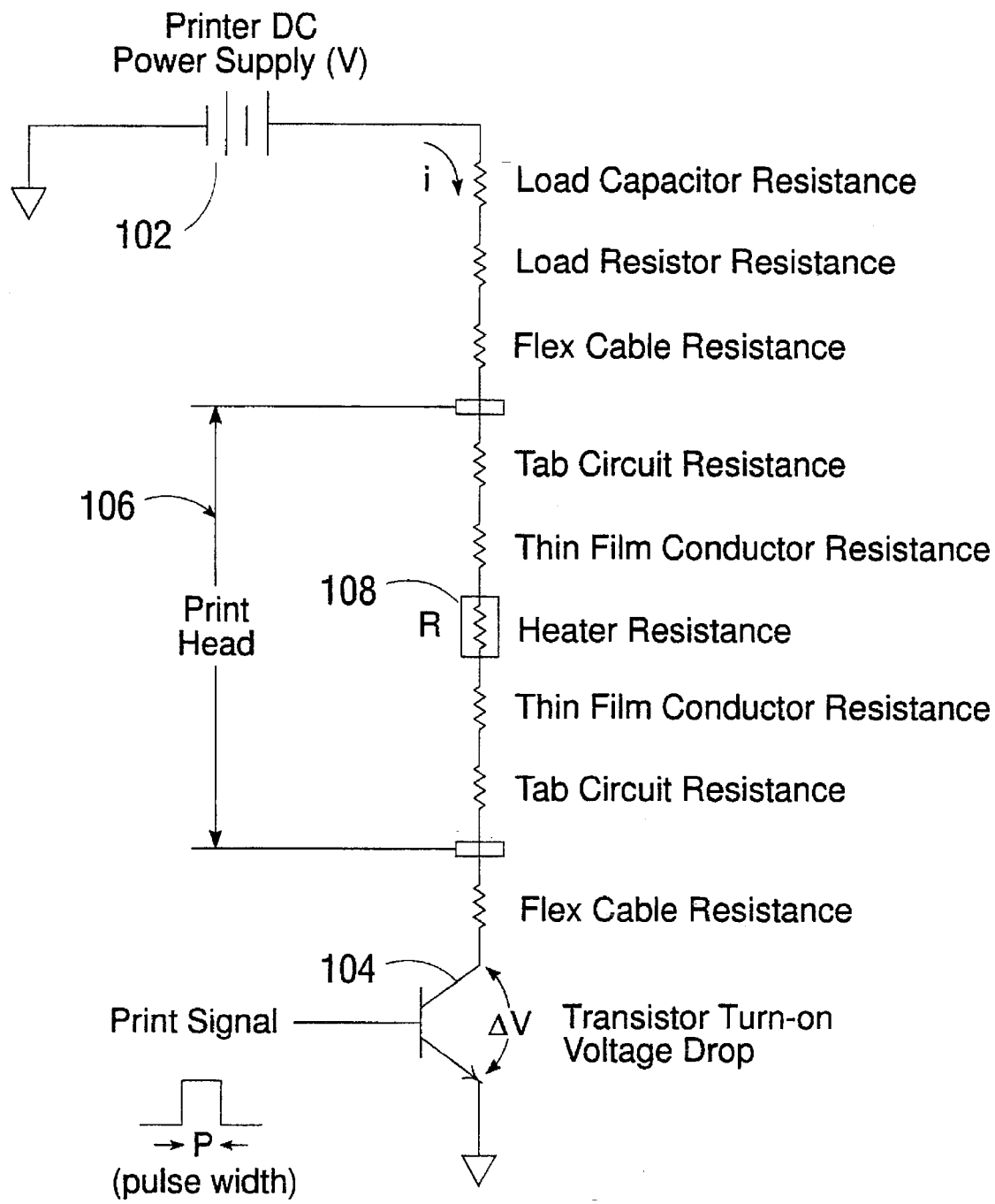
FIG. 5 is a schematic diagram of thermal ink jet circuitry, including annotations which show the constant energy density requirement.

FIG. 5 is a schematic diagram of circuitry for use with thermal ink jet thin-film printing elements in accordance with the invention. Also shown are annotations for enhanced understanding. FIG. 5 shows a schematic print circuit including a power supply voltage source, shown as 102, a print control element shown as a transistor 104, other resistances which are labeled but not assigned reference numbers, and an equivalent circuit 106 for a fabricated print head. The discussion which follows will cover geometric design considerations for the design and fabrication of the print head elements which the equivalent resistences in the equivalent circuit 106 represent.

As will be discussed, operation of the system in accordance with the invention is facilitated by maintaining a constant energy density ("ED") requirement. The printer DC power supply 102 imposes a practical requirement on the resistor heating elements, i.e., energy density at each element should be equal.

For current i, heater resistance R, pulse width p, and a given thin-film resistor having length L, width W and thickness H, the constant energy density is given by $$ED = \frac{i^2 R p}{LWH} \qquad (3)$$

The ED value of a given printhead may be between about 0.01 to about 0.06 $\mu J/\mu m^3$. Values lower than about 0.01 $\mu J/\mu m^3$ are insufficient for generating the necessary vapor bubbles in typical ink vehicles, whereas values higher than about 0.06 $\mu J/\mu m^3$ will result in premature heater breakdown for typical thin film resistors. A typical value of ED, e.g., 0.035 $\mu J/\mu m^3$, may be chosen as a first design parameter.

The current i is a function of the ratio of L/W. Given the voltage of the printer DC power supply V, the transistor turn-on voltage drop $\Delta v$, and the total resistance $\Sigma R_j$ (excluding a heater resistor element 108) of the circuitry shown in FIG. 5, the current i is given by $$i = \frac{V - \Delta V}{\sum_j R_j + p \frac{L}{WH}} \qquad (4)$$

A relation between L and W can be determined by substituting Eq. (4) into Eq. (3), for a given H value for the heater resistor film thickness.

Figure 6:
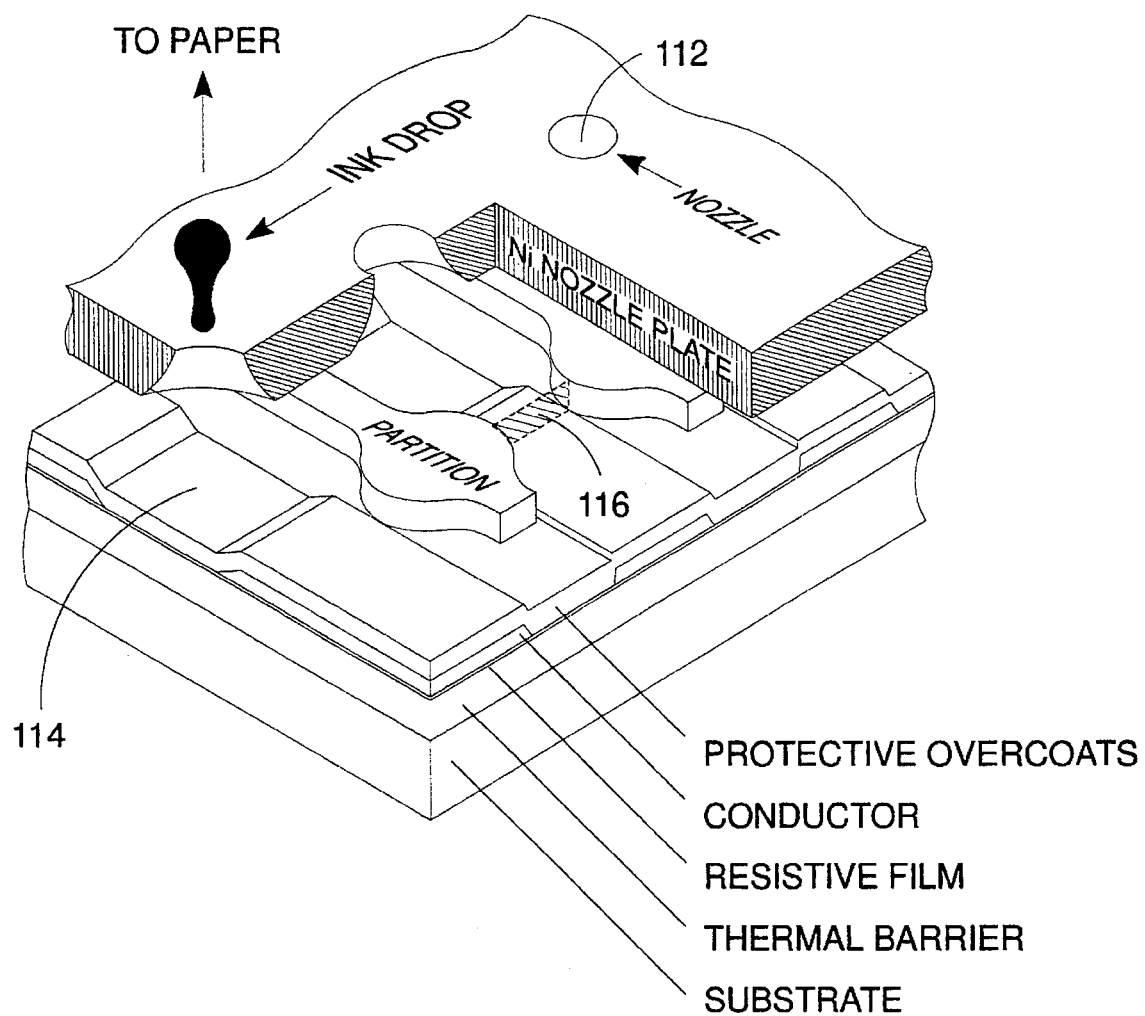
FIG. 6 is a schematic representation of a thermal inkjet printhead showing three area parameters.

A second relation between L and W can be obtained by using two specific empirical relations, based on ink refill characteristics, as depicted below. FIG. 6 is a partially cut-away perspective diagram of a thermal ink-jet print head, in which certain features can be observed. Specifically, the physical areas of certain features have to do with the above empirical relations.

Referring to FIG. 6, three area parameters, i.e., orifice or nozzle area 112, heater area 114 and choke area 116, are of importance in designing a grayscale thermal inkjet printhead. A person skilled in the art will realize that the nozzle area and the choke area are respectively the outlet and inlet areas of the bubble chamber. Note that the heater area is typically the product LW.

A second design parameter is the ink drop volume, which typically is desired to be some predetermined value. Given a desired drop volume as a second design parameter, the above-discussed print head geometrical parameters are constrained by the following proportional relation:

$$\text{ink drop volume} \propto \frac{\text{nozzle area} \times \text{heater area}}{\text{nozzle area} + \text{choke area}} \qquad (5)$$

Figure 7:
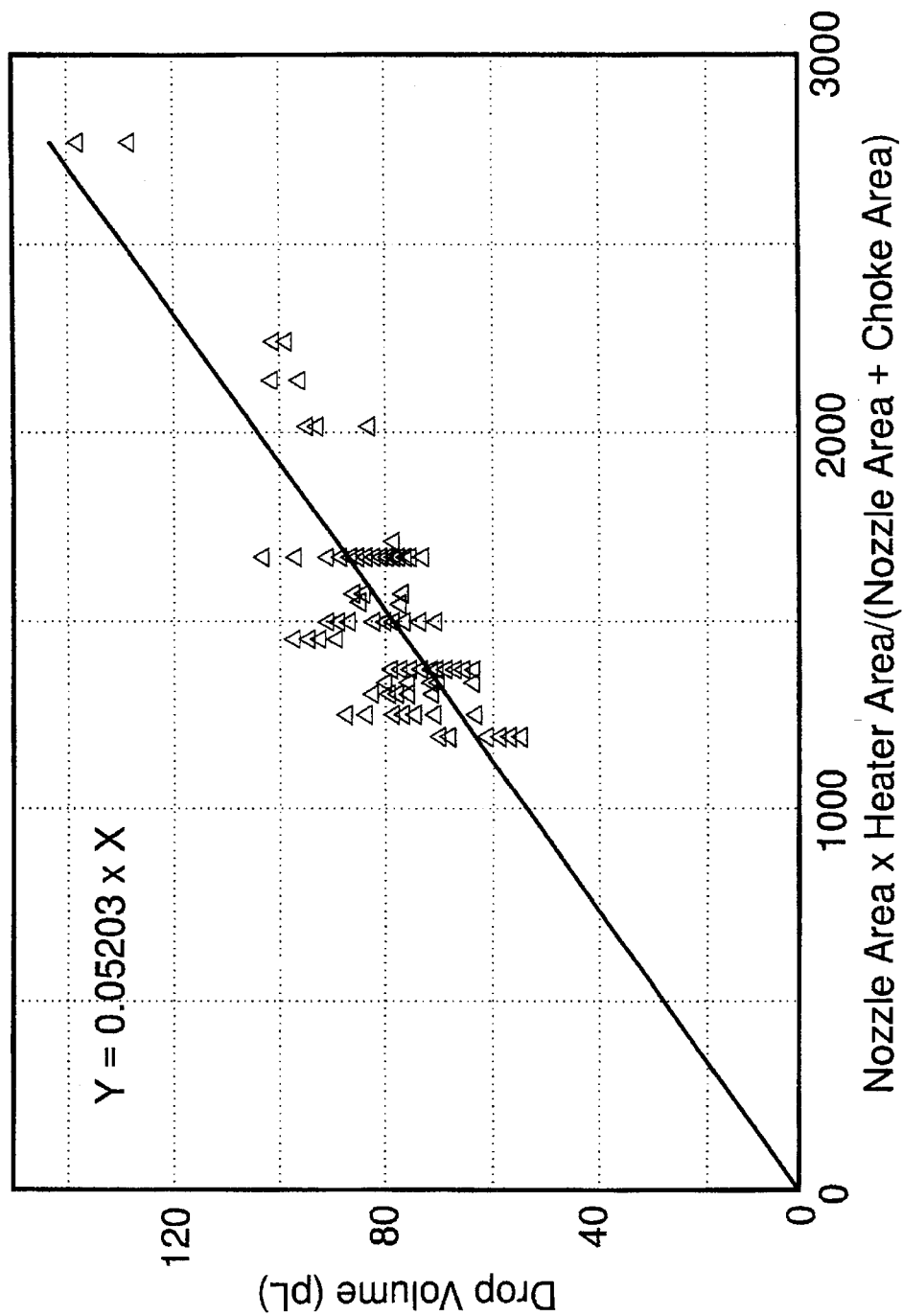
FIG. 7 is a graph which plots a typical dependence of thermal inkjet drop volume on the formula $$\frac{\text{nozzle area} \times \text{heater area}}{\text{nozzle area} + \text{choke area}} \quad (1)$$

Thus, the geometrical parameters of the print head can readily be chosen so as to satisfy relation (5). A typical correlation between these two parameters is shown in FIG. 7.

A third design parameter is the ink drop velocity, which also is typically desired to be some predetermined value. Given a desired velocity of ink droplets as a third design parameter, the above-discussed print head geometrical parameters are also constrained by the following proportional relation:

$$\text{ink drop velocity} \propto \frac{\text{heater area}}{\text{nozzle area} + \text{choke area}} \qquad (6)$$

Figure 8:
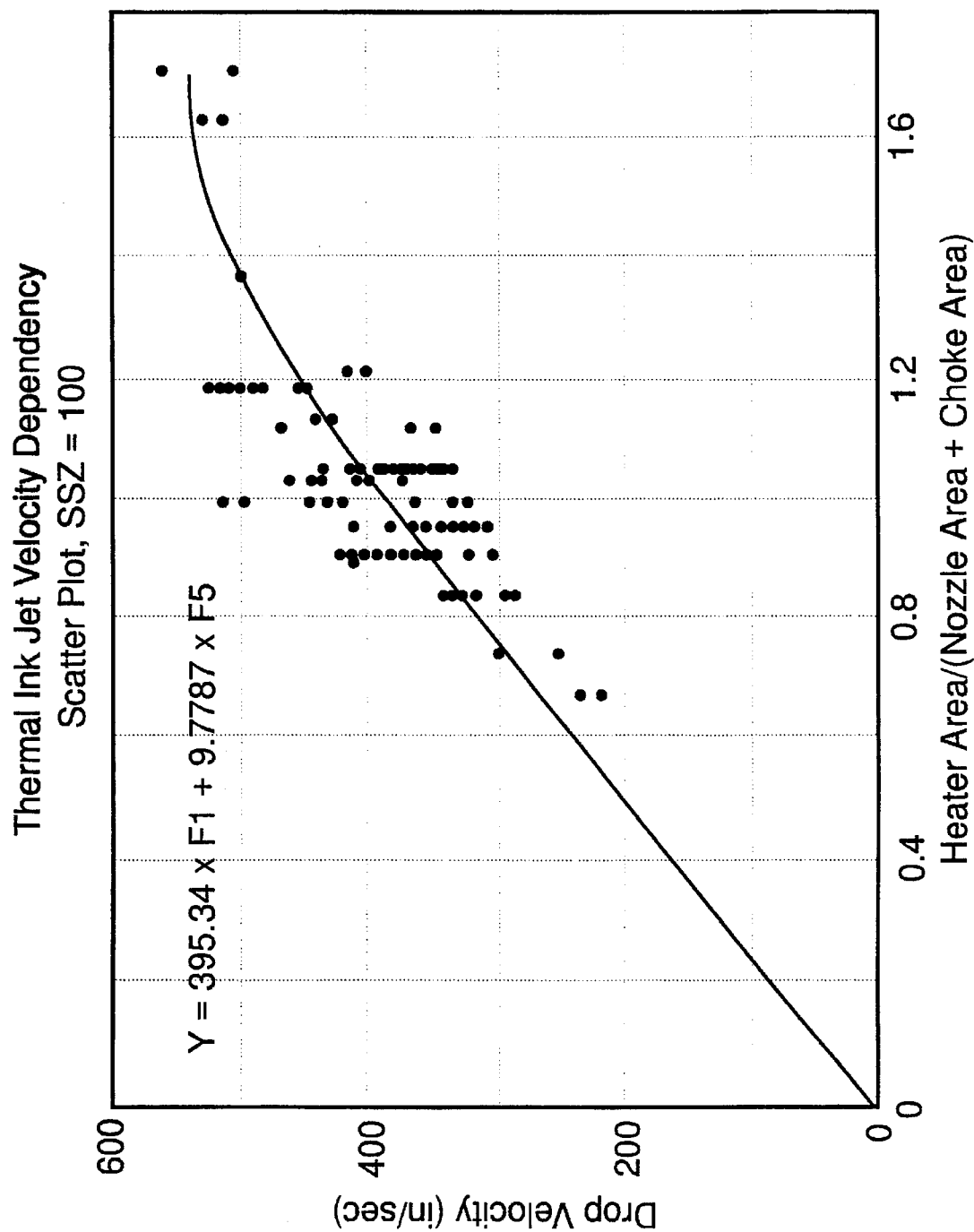
FIG. 8 is a graph which plots a typical dependence of thermal inkjet drop velocity on the formula $$\frac{\text{heater area}}{\text{nozzle area} + \text{choke area}} \quad (2)$$

Thus, the geometrical parameters of the print head can readily be chosen additionally so as to satisfy relation (6). A typical correlation between these two parameters is shown in FIG. 8.

From relations (5) and (6), above, the nozzle area can readily be determined. The heater area can then be readily determined because, as dictated by ink refill characteristics, the nozzle area and the choke area typically maintain a predetermined relationship, such as $$\text{nozzle area} = 2 \times \text{choke area} \qquad (7)$$

Once the heater area LW is determined, the length L and width W of the heater can be individually and uniquely determined by substituting the product LW into the constant energy density relation, equation (3), described above.

Figure 9:
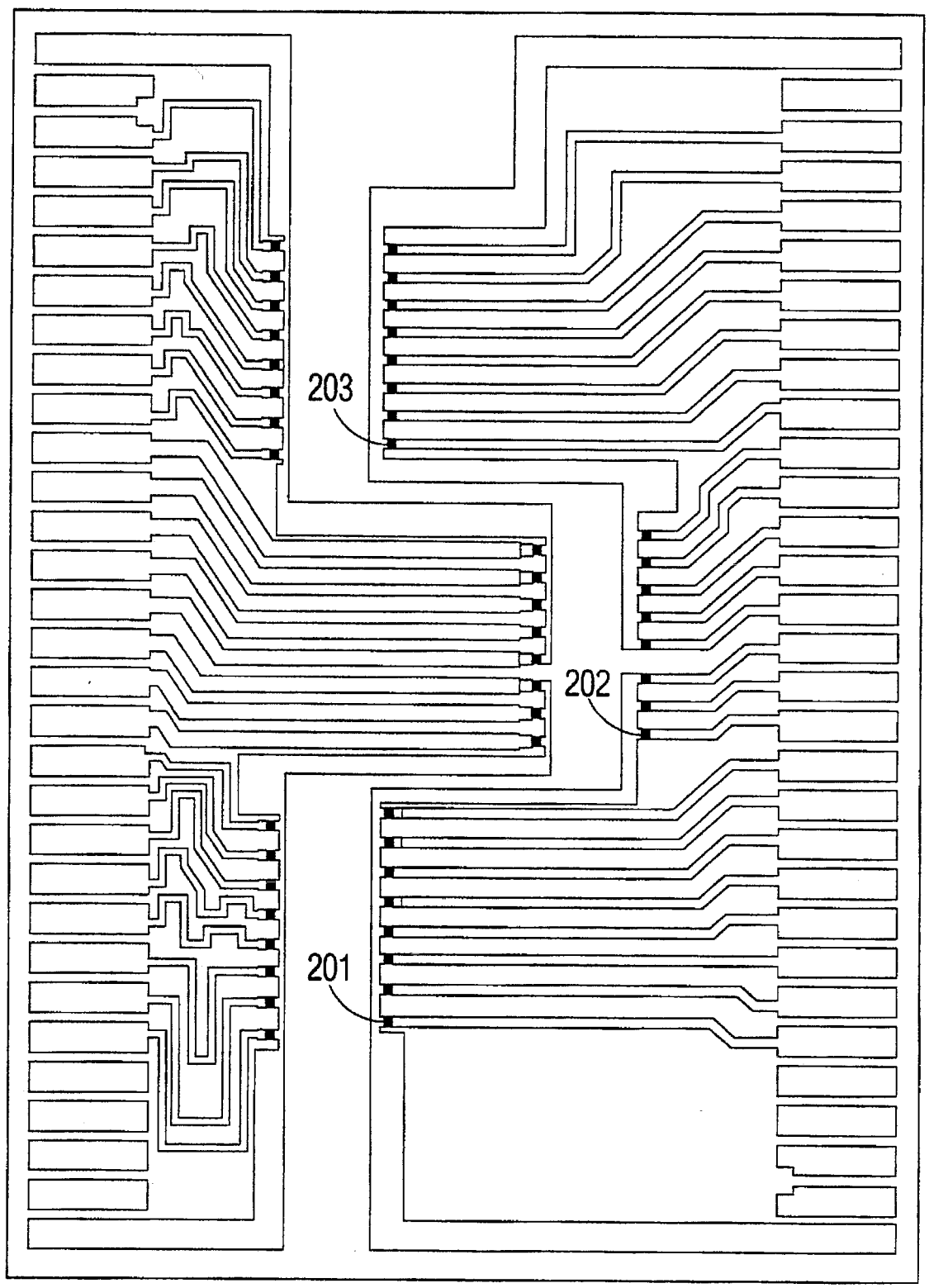
FIG. 9 is a planar representation of a typical thermal ink jet print chip, having circuitry including resistors of three different sizes, the resistors being disposed in three respective arrays of positions.

To illustrate the above method for designing a grayscale thermal inkjet printhead, FIG. 9 is a diagram of a circuit layout, incorporating typical examples of heater geometries which are required to generate three dot sizes for grayscale printing, while satisfying the constant energy requirement. Three arrays of print heads are shown as implemented in FIG. 9. An array of 60 $\mu m$ (length) by 64 $\mu m$ (width) resistors, which generate the largest dots, are shown, including an exemplary resistor 201. Medium-size dots are generated by an array of 42 $\mu m$ by 71 $\mu m$ resistors, including an exemplary resistor 202. Finally, the smallest dots are generated by 21 $\mu m$ by 50 $\mu m$ resistors, including an exemplary resistor 203.

Figure 10:
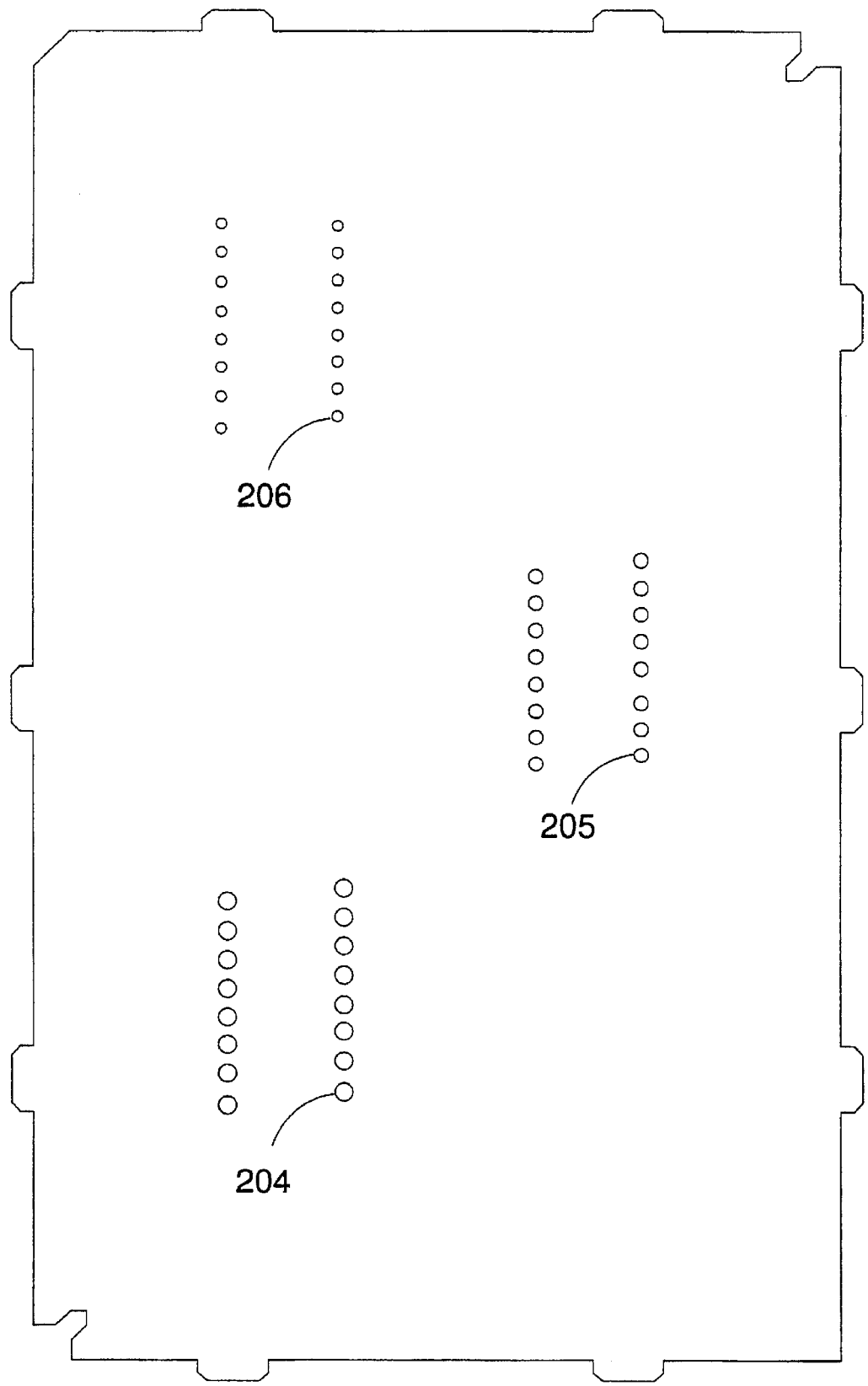
FIG. 10 is a planar representation of a typical thermal ink jet nozzle plate, to be positioned overlaying the print chip of FIG. 9, the nozzle plate having orifices of three different sizes which align with the resistor positions of the print chip of FIG. 9.

FIG. 10 depicts an ink jet nozzle plate which is to be laid over the circuitry of FIG. 9. FIG. 10 shows typical examples of orifices required to generate three dot sizes for grayscale printing. Notice that the positions of the orifices in FIG. 10 are intended to line up with the positions of the resistors of FIG. 9.

The orifices depicted in FIG. 10 are circular. Given 60 by 64 $\mu$, 42 by 71 $\mu m$ and 21 by 50 $\mu m$ resistors shown above in FIG. 9, the corresponding orifice diameters are 54 $\mu m$, 38 $\mu m$ and 20 $\mu m$, respectively. Note that the orifice and heater design does not follow intuitive or obvious scale-up rules. Exemplary large, medium, and small orifices, which line up with the resistors 201, 202, and 203, are shown as orifices 204, 205, and 206, respectively.

TONE CELL PRINTING

Having stated the design principles for thermal ink jet heaters and orifices for grayscale printing, we now present a discussion of a typical tone cell method suitable for the present grayscale printing. Initially, it is assumed that a set of grayscale values are provided. This may be done by providing an input image having a set of regions, or "pads," one for each of the desired grayscale values. Initially, the regions may be in no order. In accordance with the present invention, a preferred way to implement the tone cell method is to measure the optical intensity of each pad and reorder the pads in the order of increasing or decreasing measured optical densities.

Figure 11:
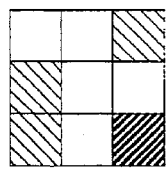
FIG. 11 is a chart depicting several typical 3×3 tone cells having dot positions that are either left blank or printed with ink of any one of three different dilutions.
Figure 11:
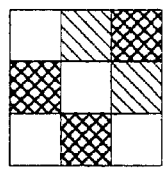
Figure 11:
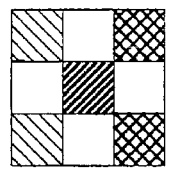
Figure 11:
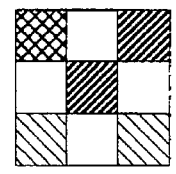
Figure 11:
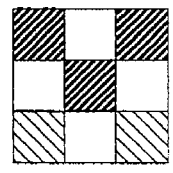
Figure 11:
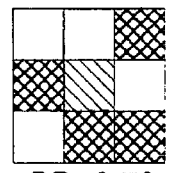
Figure 11:
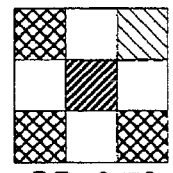
Figure 11:
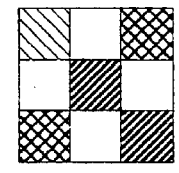
Figure 11:
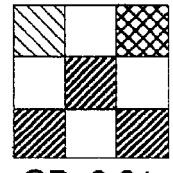
Figure 11:
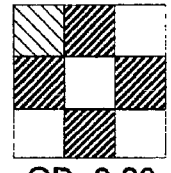
Figure 11:
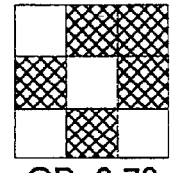
Figure 11:
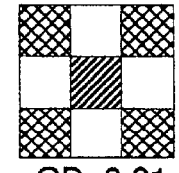
Figure 11:
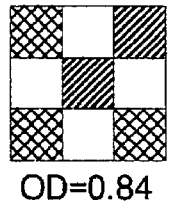
Figure 11:
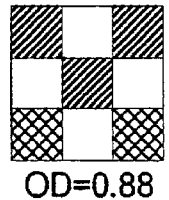
Figure 11:
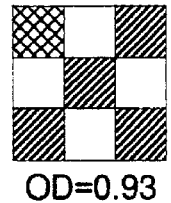
Figure 11:
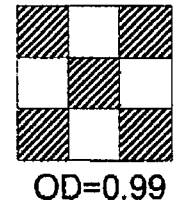
Figure 11:
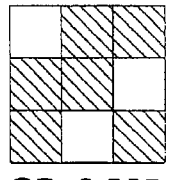
Figure 11:
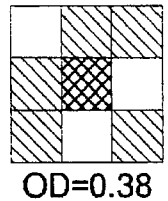
Figure 11:
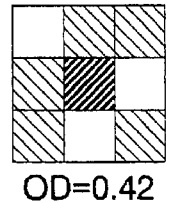
Figure 11:
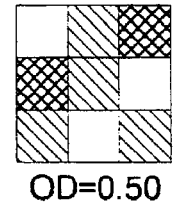

As an example of the above empirical approach for setting up the grayscale steps, consider the several typical 3×3 tone cells of FIG. 11. Each of the nine dot positions in a tone cell is either left blank or printed with ink of any one of three different dilutions. A total of 256 different tone levels may be produced using tone cells as described here.

Figure 12:
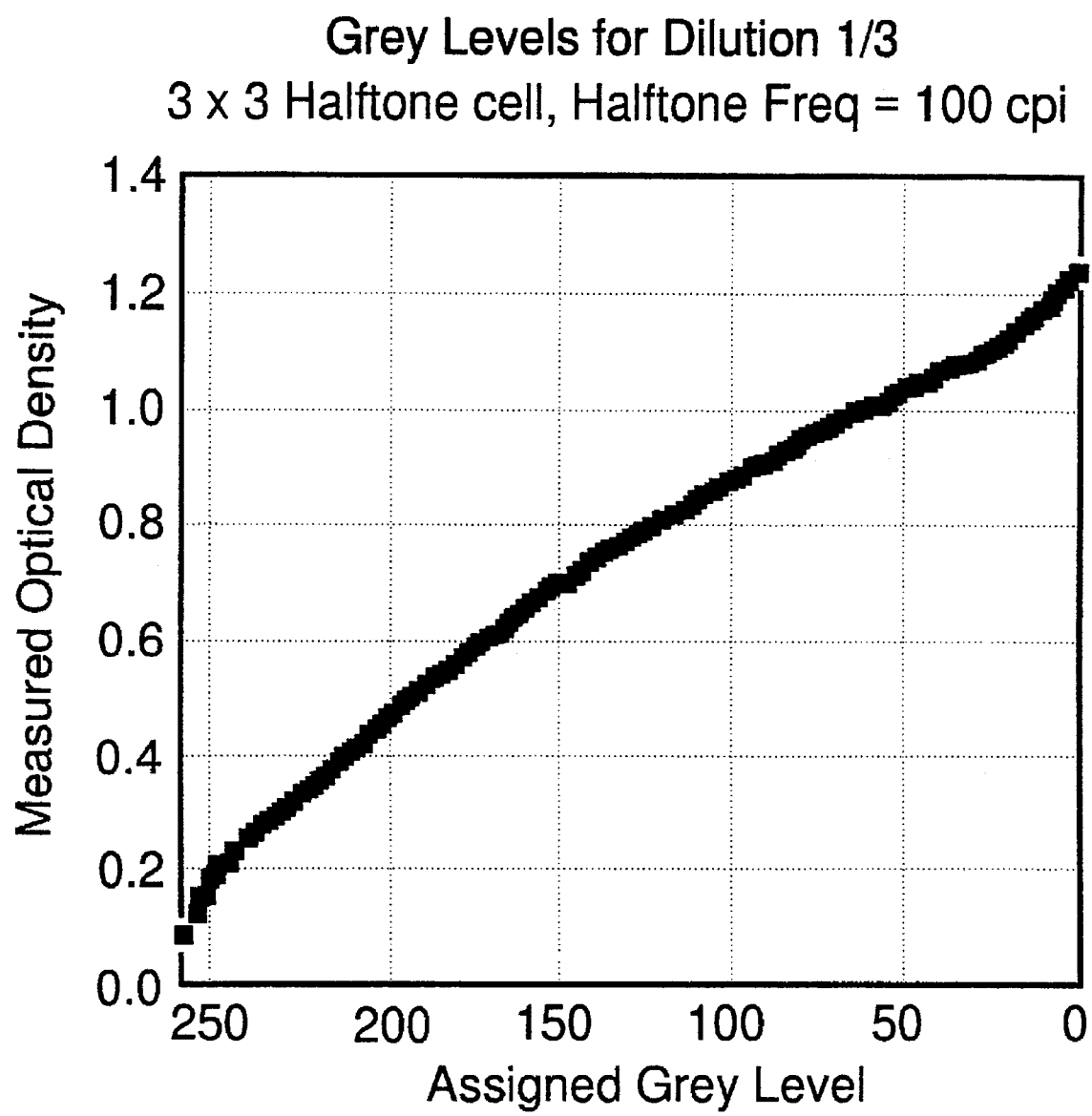
FIG. 12 is a graph which plots measured optical densities versus assigned gray levels generated by a set of 256 tone cells exemplified by those of FIG. 11.

Now, the input image is analyzed to determine the number of distinct grayscale values it contains. Assume, for example, that the input image contained 220 grayscale tones. Assume also that the input image is to be printed on a given printing medium. The 220 observed grayscale tones in the input are measured for their optical densities on the given printing medium, and reordered in the order of increasing values of measured optical density. The observed grayscale tones are then plotted against the 256 tone levels producable according to the above tone cell definition. An exemplary plot is shown in FIG. 12.

To extend the 220 gray levels to 256 levels, tone cells at the low-OI end may be conveniently and empirically repeated several times. On the other hand, several tone cells of different dot patterns may give the same measured optical density. A person skilled in the art will recognize that such "replicates" will have a quasi-error-diffusion effect which is helpful in eliminating area texturing in the printed image.

Figure 13:
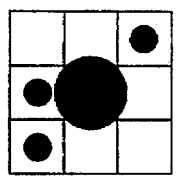
FIG. 13 depicts several typical 3×3 tone cells having dot positions that are either left blank or printed with "black" ink spots of any one of three different sizes.
Figure 13:
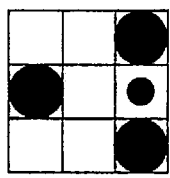
Figure 13:
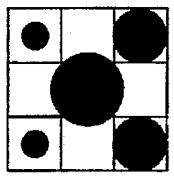
Figure 13:
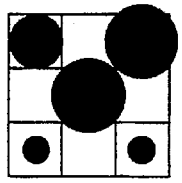
Figure 13:
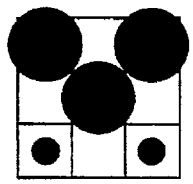
Figure 13:
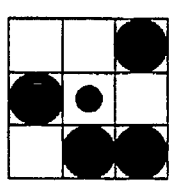
Figure 13:
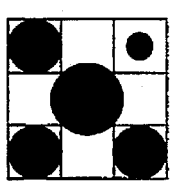
Figure 13:
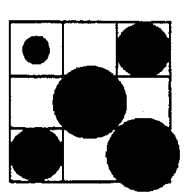
Figure 13:
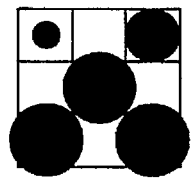
Figure 13:
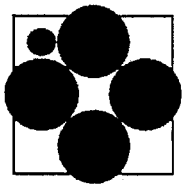
Figure 13:
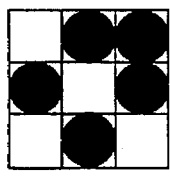
Figure 13:
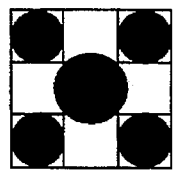
Figure 13:
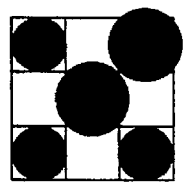
Figure 13:
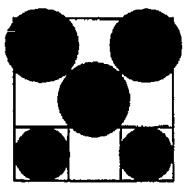
Figure 13:
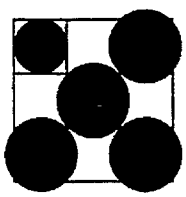
Figure 13:
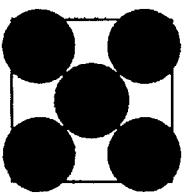
Figure 13:
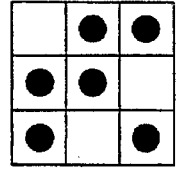
Figure 13:
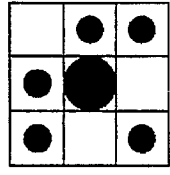
Figure 13:
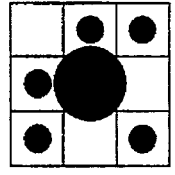
Figure 13:
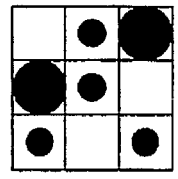
Figure 14:
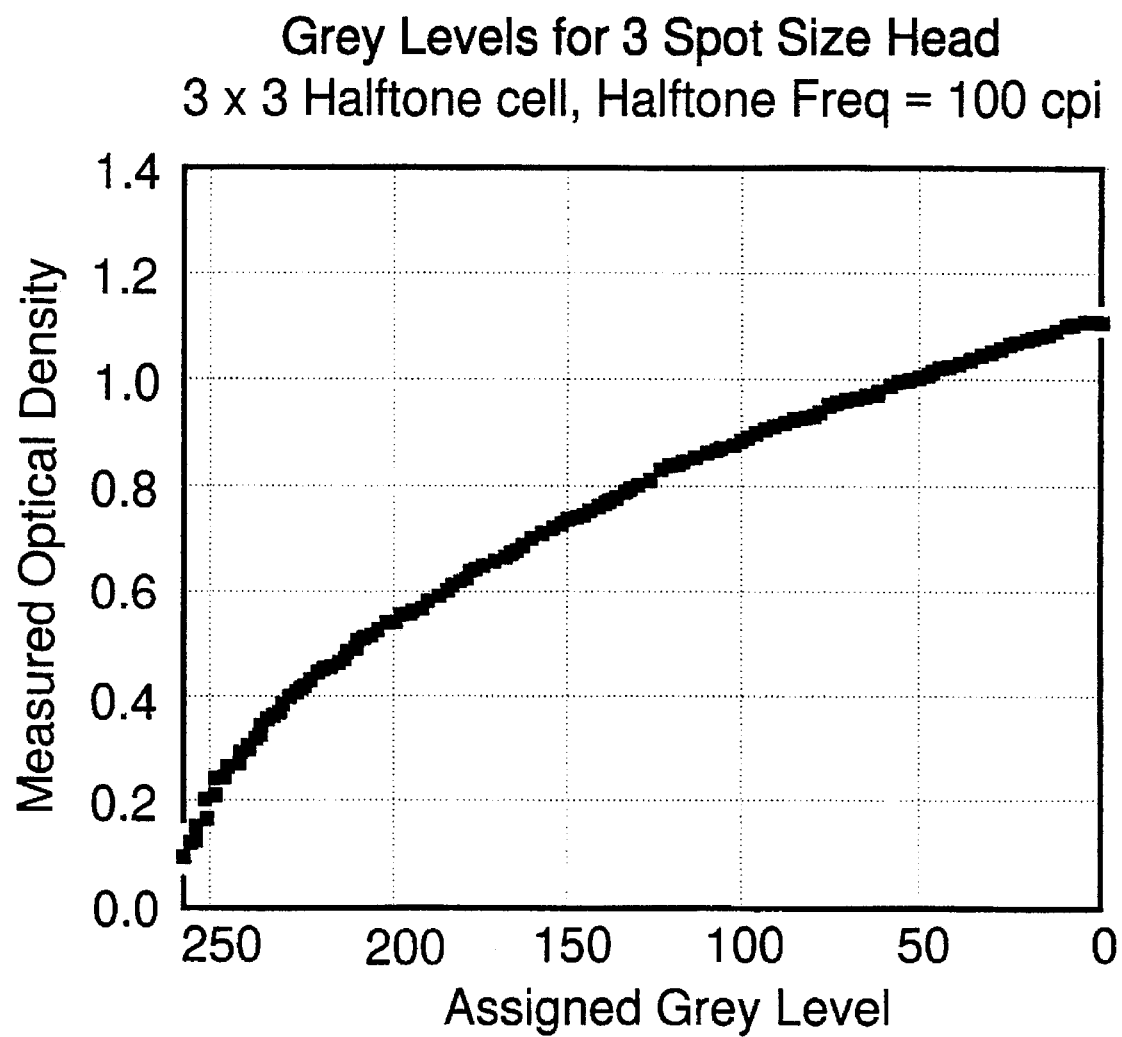
FIG. 14 is a graph which plots measured optical densities versus assigned gray levels generated by a set of 256 tone cells exemplified by those of FIG. 13.

As another example of the above empirical approach for setting up the grayscale steps, consider the several typical 3×3 tone cells in FIG. 13, each tone cell having dot positions that are either left blank or printed with "black" ink spots of any one of three different sizes. Having measured the optical density of each pad printed on a typical printing medium, the 220 pads are reordered in the order of increasing values of measured optical density and plotted against a total of 256 assigned gray levels as shown in FIG. 14. To extend the 220 gray levels to 256 levels, tone cells at the low-OI end may be conveniently and empirically repeated several times.

Those skilled in the art will recognize that the foregoing description has been presented for the purposes of illustration and description only. It is not intended to be exhaustive or to limit the invention to the precise forms disclosed, and obviously many modifications and variations are possible in light of the above teachings. For example, communication between the computer and the printer box can be either serial or parallel in nature. The data stream can be pixel by pixel or color plane by color plane in any predetermined order so long as the scheme is compatible with the printer controller. Therefore, the embodiments set forth herein are presented in order to best explain the principles of the present invention and its practical applications to thereby enable others skilled in the art to best utilize the present invention in various embodiments, modifications, and equivalents as are suited to the particular use contemplated.

What is claimed is:

1. A printing system for printing color and greyscale images based, respectively, on color and grey tone image information, the system comprising:

an image processing and printing system having respective primary color information inputs, and a printer driver including respective multiple channels, for a set of respective primary colors;

a front-end color interpreter having:
(i) means for converting color image information into respective bodies of image information for respective primary colors, and
(ii) means for coupling color image information to respective ones of the primary color information inputs of the image processing and printing system:

a front-end grey tone interpreter having:
(i) means for converting grey tone image information into respective bodies of image information for respective grey tone levels, and
(ii) means for coupling the respective bodies of image information to respective ones of the primary color information inputs of the image processing and printing system;

the front-end color interpreter and the front-end grey tone interpreter being interchangeably couplable to the image processing and printing system:

a color print head having:
(i) a plurality of inputs for coupling to the image processing and printing system and for receiving respective bodies of image information for respective primary colors therefrom, and
(ii) means for printing respective primary colors based on the received respective bodies of image information for respective primary colors; and a greyscale print head having:
(i) a plurality of inputs for coupling to the image processing and printing system and for receiving respective bodies of image information for respective grey tone levels therefrom, and
(ii) means for printing respective grey tone levels based on the received respective bodies of image information for respective grey tone levels;

the color print head and the greyscale print head being interchangeably couplable to the image processing and printing system.

2. A printing system as recited in claim 1, wherein the printer driver of the image processing and printing system includes one of:

a first architecture having separate, parallel data paths for each of the bodies of image information; and a second architecture having (i) separate, parallel data paths for the bodies of image information, and (ii) means for serially multiplexing the bodies of image information onto the data paths.

3. A printing system as recited in claim 1, wherein:

the front-end color interpreter includes:
(i) means for producing an array of image elements from the color image information, each image element having one of a predetermined set of primary colors,
(ii) means for segregating the array into a plurality of subarrays, each subarray corresponding with one of the primary colors and including the image elements of that primary color, and
(iii) means for coupling the subarrays to respective ones of the printing and processing system inputs; and the front-end grey tone interpreter includes:
(i) means for producing an array of image elements from the grey tone image information, each image element having one of a predetermined set of optical intensities, (ii) means for segregating the array into a plurality of subarrays, each subarray corresponding with one of the optical intensities and including the image elements having that optical intensity, and (iii) means for coupling the subarrays to respective ones of the printing and processing system inputs.

4. A printing system as recited in claim 1, wherein:

respective inks having dye concentrations related to respective ones of the grey tone levels are to be used with the system; and the means for printing respective grey tone levels includes means for printing respective grey tone levels using a matrix of ink dots of the respective inks;

whereby information printed has grey tone levels related to the respective inks used by the means for printing respective grey tone levels.

5. A printing system as recited in claim 1, wherein the means for printing respective grey tone levels includes:

means for printing information in dot-matrix form; and means for printing a matrix of ink dots having dot sizes related to the grey tone levels.

6. A method for converting a color printer to a grayscale printer, the color printer including a printer driver, a plurality of channels for carrying information relating to a plurality of respective primary colors in an image to be printed, the image including gray tome image information, and a color print head apparatus, the method comprising the steps of:

installing a front-end gray tone interpreter to couple with, and work cooperatively with, the printer driver, the front-end gray tone interpreter including:

(i) means for converting the grey tone image information into respective bodies of image information for respective grey tone optical intensity levels, and (ii) means for coupling the respective bodies of image information to respective channels of the color printer; and installing a gray tone print head in place of the color print head, the gray tone print head including:

(i) a plurality of inputs for coupling to a color image pringing system and for receiving the respective bodies of image information therefrom, and (ii) means for printing respective grey tone levels based on the received respective bodies of image information.

7. A method for operating a printing system for printing color images and high-resolution greyscale images made up, respectively, of color image information and greyscale image information, the system including an image processing and printing apparatus having a plurality of channels, a front-end color interpreter, a front-end greyscale interpreter, a color print head for printing a plurality of primary colors, and a greyscale print head for printing a plurality of greyscale intensities, the method comprising the steps of:

(A) printing a color image by performing the steps of:

coupling the front-end color interpreter and the color print head to the image processing and printing apparatus;

converting the color image information into respective bodies of image elements, each input image element having one of a predetermined set of primary colors, dividing the image elements into respective bodies of color image elements based on the respective primary colors of the image elements;

coupling the respective bodies of image information to respective ones of the channels of the image processing and printing apparatus, and providing the respective bodies of image information to the color print head to be printed according to respective ones of the primary colors of the color print head; and (B) printing a greyscale image by performing the steps of:

coupling the front-end greyscale interpreter and the greyscale print head to the image processing and printing apparatus, converting the grey tone image information into respective bodies of image elements, each input image element having one of a predetermined set of greyscale optical intensity levels, dividing the image elements into respective bodies of GRAYSCALE image elements based on the respective optical intensity levels of the image elements;

coupling the respective bodies of image information to respective ones of the channels of the image processing and printing apparatus, and providing the respective bodies of image information to the greyscale print head to be printed according to respective ones of the greyscale intensities of the greyscale print head.

* * * * *